Jan. 25, 1938.　　　　C. J. HARLOW　　　　2,106,636
BRAKE OPERATING MECHANISM
Filed June 4, 1937　　　2 Sheets-Sheet 1

Inventor
C. J. Harlow
By Clarence A. O'Brien
Hyman Berman
Attorneys

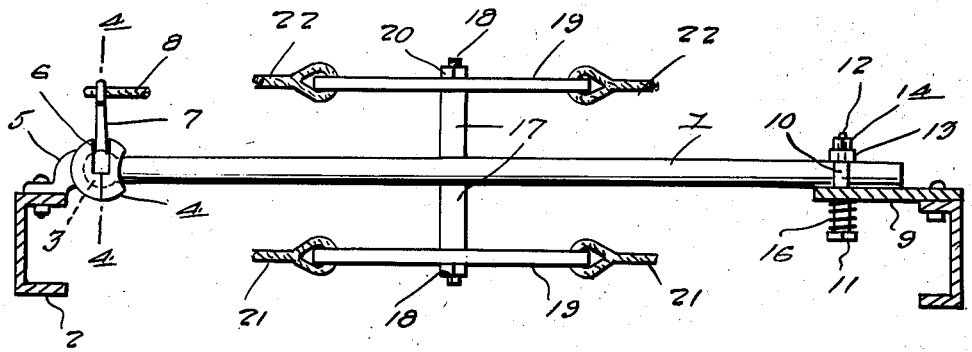
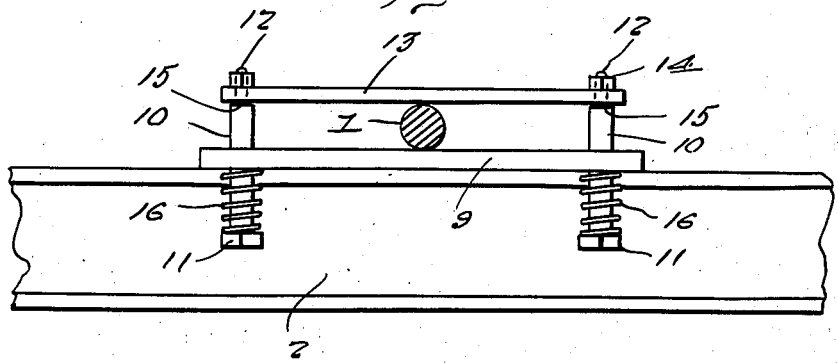
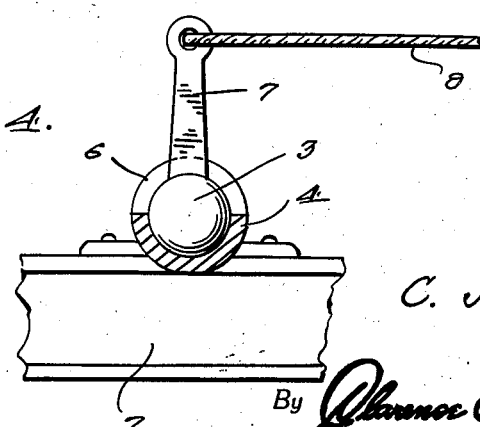

Patented Jan. 25, 1938

2,106,636

UNITED STATES PATENT OFFICE 2,106,636

BRAKE OPERATING MECHANISM

Clark J. Harlow, Deer Park, Ohio

Application June 4, 1937, Serial No. 146,516

3 Claims. (Cl. 188—204)

The present invention relates to new and useful improvements in brake operating mechanisms for automobiles and has for its primary object to provide, in a manner as hereinafter set forth, a novel construction, combination and arrangement of parts whereby equal power will be transmitted to all four brakes of the vehicle from the foot pedal.

Other objects of the invention are to provide a brake operating mechanism of the aforementioned character which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a cross sectional view, taken substantially on the line 2—2 of Fig. 1.

Figure 3 is a view in vertical longitudinal section, taken substantially on the line 3—3 of Fig. 1.

Figure 4 is a vertical sectional view, taken substantially on the line 4—4 of Fig. 2.

Figure 1:
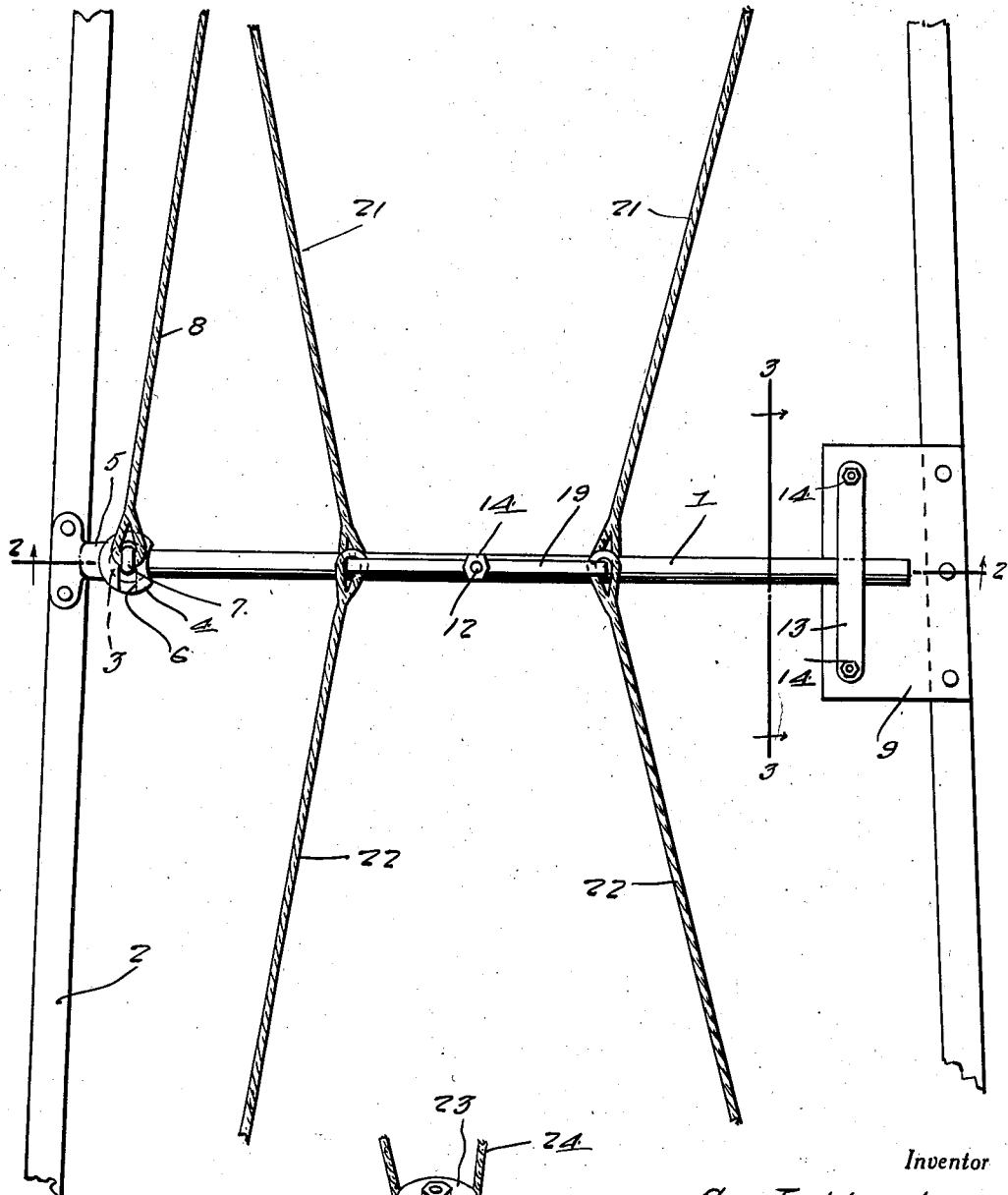
Figure 1 is a plan view of a brake operating mechanism constructed in accordance with the present invention.

Referring now to the drawings in detail, it will be seen that the reference numeral 1 designates a transverse shaft of suitable metal which is mounted on the frame 2 of the vehicle at an intermediate point. At one end, the transverse shaft 1 terminates in a ball 3 which is journalled in a socket 4 on a bracket 5 which is rigidly secured to one side of the frame 2.

The socket 4 has formed therein a slot 6 in which an upstanding arm 7 on the ball 3 is adapted to swing. A suitable flexible cable 8 connects the arm 7 to the brake pedal (not shown) of the automobile.

Mounted on the other side of the frame 2 of the vehicle is a horizontally projecting plate 9 over which the free end portion of the shaft 1 projects. Mounted for vertical sliding movement in the end portions of the plate 9 are rods 10 having heads 11 on their lower ends. At their other ends, the rods 10 terminate in reduced, threaded shanks 12 on which a longitudinally extending bar 13 is mounted. Nuts 14 on the shanks 12 secure the bar 13 in position. It will be observed that the bar 13 is secured between the nuts 14 and the shoulders 15 which are provided by the reduced shanks 12 on the rods 10. Coil springs 16 encircle the lower portions of the rods 10 and have one end engaged beneath the plate 9 and their other ends engaged with the heads 7 for yieldingly clamping the bar 13 on the shaft 1 in a manner to permit swinging movement of this end of said shaft in a horizontal plane but to prevent rattling.

Extending upwardly and downwardly from the shaft 1 at an intermediate point are arms 17 which may be of any suitable length. The arms 17 terminate, at their free ends, in reduced threaded shanks 18 on which cross heads 19 are journalled for swinging movement. Nuts 20 are threaded on the shanks 18 for retaining the cross heads 19 in position. Flexible cables or the like 21 extend from the ends of the lower cross head 19 to the front brakes of the vehicle and similar cables 22 connect the rear brakes of said vehicle to the upper cross head 19.

It is thought that the operation of the invention will be readily apparent from a consideration of the foregoing. When the brake pedal of the vehicle is depressed in the usual manner the cable 8 rocks the shaft 1 in a direction to swing the upper cross head 19 forwardly and the lower cross head 19 rearwardly thereby applying the brakes. The pivotal mounting of the cross-heads 19 permits the front brakes to equalize themselves against each other and the rear brakes to equalize themselves against each other. Then, the pivotal mounting of the rockable shaft 1 permits the front brakes and the rear brakes of the vehicle to equalize themselves against each other. In other words, the front brakes pull against each other, the rear brakes pull against each other, and the front and rear brakes, in turn, pull against each other. As hereinbefore stated, the spring pressed bar 13 permits swinging movement of the free end portion of the rockable shaft 1 but prevents rattling.

Figure 5:
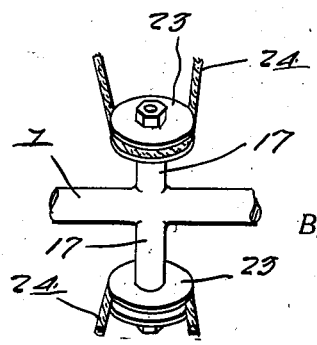
Figure 5 is a perspective view of a modification.

In the modification shown in Fig. 5 of the drawings, pulleys 23 are journalled on the end portions of the arms 17. Trained around the pulleys 23 and connected at their ends to the front and rear brakes of the automobile are suitable cables or the like 24. The operation of this modification is substantially similar to that described for the arrangement shown in Figs. 1 to 4, inclusive, the pulleys 23 taking the place of the pivotally mounted cross heads 19.

It is believed that the many advantages of a brake operating mechanism constructed in accordance with the present invention will be readily understood and although preferred embodiments of the invention are as illustrated and described, it is to be understood that further modifications and changes in the details of construction may be resorted to which will fall within the scope of the invention as claimed.

What is claimed is:—

1. A brake operating mechanism for vehicles comprising a transverse shaft having one end pivotally and rockably connected to one side of a vehicle, a plate on the other side of said vehicle, the other end portion of the shaft resting on said plate, spring pressed rods slidably mounted in said plate, a bar mounted on said rods and engaged with said other end portion of the shaft for yieldingly securing same against the plate, means connected to the pivoted end of the shaft for rocking said shaft, members pivotally mounted on opposite sides of the shaft at an intermediate point, flexible members adapted to connect one of the first named members to the front brakes of the vehicle, and flexible members adapted to connect the other of said first named members to the rear brakes of the vehicle.

2. A brake operating mechanism for vehicles having front and rear wheel brakes, comprising a socket mounted on one side of the vehicle at an intermediate point, said socket having a slot therein, a transverse shaft including a ball on one end journalled in the socket, an arm fixed on said ball and operable in the slot, an operating element connected to said arm for rocking the shaft, arms projecting from opposite sides of the shaft at an intermediate point, crossheads pivotally mounted on the second named arms, flexible elements adapted to connect the ends of one of said crossheads to the front brakes of the vehicle, flexible elements adapted to connect the ends of the other of said crossheads to the rear brakes of the vehicle, and means for securing the other end of the shaft to the other side of the vehicle for swinging movement.

3. A brake operating mechanism for vehicles having front and rear wheel brakes, comprising a socket mounted on one side of the vehicle at an intermediate point, said socket having a slot therein, a transverse shaft including a ball on one end journalled in the socket, an arm fixed on said ball and operable in the slot, an operating element connected to said arm for rocking the shaft, arms projecting from opposite sides of the shaft at an intermediate point, crossheads pivotally mounted on the second named arms, flexible elements adapted to connect the ends of one of said crossheads to the front brakes of the vehicle, flexible elements adapted to connect the ends of the other of said crossheads to the rear brakes of the vehicle, and means for securing the other end of the shaft to the other side of the vehicle for swinging movement, said means including a plate mounted on the vehicle and engaged with the free end portion of the shaft, rods mounted for vertical sliding movement in the plate and including heads on one end, a bar mounted on the other ends of said rods and engaged with the shaft, and springs mounted on the rods and having one end engaged with the plate and their other ends engaged with the heads for yieldingly clamping the bar on the shaft.

CLARK J. HARLOW.